United States Patent [19]
Cho et al.

[11] Patent Number: 5,974,209
[45] Date of Patent: Oct. 26, 1999

[54] SYSTEM COMPRISING AN ELECTROABSORPTION MODULATOR AND AN OPTICAL DISCRIMINATOR

[76] Inventors: Pak Shing Cho, 24 Spring St., Gaithersburg, Md. 20877; Daniel Mahgerefteh, 3005 Porter St. NW., Washington, D.C. 20008

[21] Appl. No.: 09/069,714

[22] Filed: Apr. 30, 1998

[51] Int. Cl.$^6$ .................................................. G02B 6/26
[52] U.S. Cl. .................................. 385/28; 385/3; 385/37; 385/27; 385/39
[58] Field of Search ........................... 385/28, 27, 1–10, 385/37, 38, 39; 359/248, 276, 293, 176, 140

[56] References Cited

U.S. PATENT DOCUMENTS

| | | | |
|---|---|---|---|
| 5,559,628 | 9/1996 | Devaux | 359/248 |
| 5,764,396 | 6/1998 | Yoneyama | 359/178 |

*Primary Examiner*—Phan T. H. Palmer
*Attorney, Agent, or Firm*—H. C. Lin Patent Agent

[57] ABSTRACT

Optical signal produced by a semiconductor electroabsorption modulator is passed through an optical discriminator to increase the optical and electrical modulation response of the device and decrease the output chirp for distortionless transmission through dispersive optical fiber.

20 Claims, 8 Drawing Sheets

SYSTEM COMPRISING AN ELECTROABSORPTION MODULATOR AND AN OPTICAL DISCRIMINATOR

The application is co-pending with application Ser. No. 09/066,744, filed Apr. 24, 1998 and application Ser. No. 09/065,686, filed Apr. 30, 1998.

BACKGROUND OF THE INVENTION

This invention relates to optical signal processing and transmission in fiber-optic communication systems.

Fiber-optic communication systems require transmitters that can encode optical signals with digital information. The two most widely used data formats are non-return-to-zero (NRZ) where the intensity does not go to zero between continuous 1 bits and return-to-zero (RZ) where the intensity returns to zero between continuous 1s as shown in FIG. 1. Optical transmitters using external high-speed modulators with low-chirp are essential for high-data-rate long-haul communication systems. Lithium niobate electro-optic intensity modulators have nearly zero output optical frequency modulation or chirp and are commonly used in commercial transmitters. However, they require large driving voltages at high bit rates (>2.5 Gb/s). Semiconductor electroabsorption modulators are key components for high-speed transmitters because they can be driven at low voltages (<3 Volts) even at high bit rates as described by Kataoka et al. in *Electron. Lett.*, vol. 28, pp. 897–898 (1992). They can be constructed to be polarization insensitive, and are integrable with semiconductor lasers and amplifiers. However, they have two drawbacks: limited modulation speed caused by device capacitance and chirp.

There are two main types of electroabsorption modulators, namely, multiple-quantum-well and bulk waveguide devices. Both of these modulators operate under the principle that the optical absorption coefficient of the semiconductor increases in response to an applied electric field as described by Wood in *J. Lightwave Technology*, vol. 6, p. 743 (1988) and Keldysh in *Soviet Phys. JETP*, vol. 34, p. 788 (1958). This effect is intrinsically high-speed with response time in the sub-picosecond range. However, the modulation bandwidth of electroabsorption modulators is critically limited by device capacitance. The capacitance can be reduced somewhat by decreasing device area and/or increasing the waveguide layer thickness. But this comes at a significant trade-off of lower modulation on/off ratio, higher drive voltages, and more complicated and expensive device packaging.

Intensity modulators with low or negative chirp parameters are essential for long-haul transmission in conventional 1.3-μm zero-dispersion optical fiber. The chirp parameter is a measure of the broadening of the spectrum of the modulated optical signal relative to the amount of its amplitude modulation as described by Devaux et al., in *J. Lightwave Technology*, vol. 11, p. 1937 (1993). The chirp parameter of electroabsorption modulator varies between −5 to 5 depending on many factors such as material structure, input wavelength, and applied voltage. This should be compared with the Mach-Zehnder type electro-optic intensity modulator with a chirp parameter approaching zero independent of applied voltage as described by Koyama et al. in "Frequency chirping in external modulators," *J. Lightwave Technology*, vol. 6, p. 87 (1988). Nonetheless, propagation in conventional fibers up to 300 km at 2.5 Gb/s using electroabsorption modulator-based transmitter has been demonstrated by Ishimura et al. in "Small chirp and wide bandwidth integrated modulator-laser at zero offset-bias operation," ECOC '97 *Technical Digest*, p. 171, 1997. At higher bit rates, the maximum propagation distance is limited because of the finite output chirp from the electroabsorption modulator. Chirp leads to severe signal distortion, inter-symbol interference, and even timing jitter after propagation through long distance of dispersive optical fiber. This results in unacceptable bit-error-rate at the receiver.

Electroabsorption modulators exhibit a highly nonlinear transfer characteristic versus voltage as described by Devaux et al. in "Optical processing with electroabsorption modulators," OFC '98 *Technical Digest*, p. 285, 1998. This nonlinear transfer characteristic is a result of the exponential nature of the absorption edge of the semiconductor. The nonlinearity can be exploited in applications such as all-optical wavelength conversion as described by Edagawa et al. in OFC '97 *Technical Digest*, p. 77, 1997, and generation of optical pulses as described by Devaux in "Light pulse generator," U.S. Pat. No. 5,559,628. The speed of the electroabsorption modulator for these applications depends on how well the modulator can respond to high-speed electric field modulation and is also limited by the device capacitance. Because of the finite size of the device, there is a lower limit of the capacitance and thus there exists an ultimate limit of the modulation bandwidth of electroabsorption modulators as described by Wood. Beyond this limit, optical signals from the modulator are severely distorted.

SUMMARY OF THE INVENTION

It is therefore an object of the present invention to increase the propagation distance of optical signals generated from transmitters comprising a continuous-wave laser and a voltage-driven electroabsorption modulator. It is another object of this invention to increase the modulation frequency response of an electroabsorption modulator used in such transmitters. Another object of this invention is to increase the modulation response of an electroaborption modulator for all-optical modulation. Yet another object of this invention is to increase the modulation response of an electroabsorption modulator for generation of optical pulses.

These objectives are achieved by passing optically modulated signals from the electroabsorption modulator through an optical discriminator. The spectrum of the signal is placed on the slope of the discriminator. The sign of the discriminator's transmission slope is chosen according to the sign of the electroabsorption modulator's chirp parameter, α, as described below. Efficient conversion of phase to intensity modulation is achieved when the appropriate sign, magnitude, and operating point of the discriminator slope is used. This effectively increases the frequency response of the modulator. At the same time, the output chirp is reduced because the phase modulation is converted to useful intensity modulation. This increases the transmission distance of the corrected optical signal.

DETAILED DESCRIPTION OF THE PREFERRED EMBODIMENT

The present invention uses an optical discriminator to improve the modulation response of an electroabsorption modulator by conversion of phase to intensity modulation. The phase modulation accompanying the intensity modulated output of an electroabsorption modulator is caused by the refractive index change associated with the optical absorption coefficient according to the Kramers-Kronig relation. According to our invention, this phase modulation can be converted to intensity modulation using an optical discriminator to correct signals that were corrupted as a result of the limited temporal and frequency response of the electroabsorption modulator.

Figure 1:
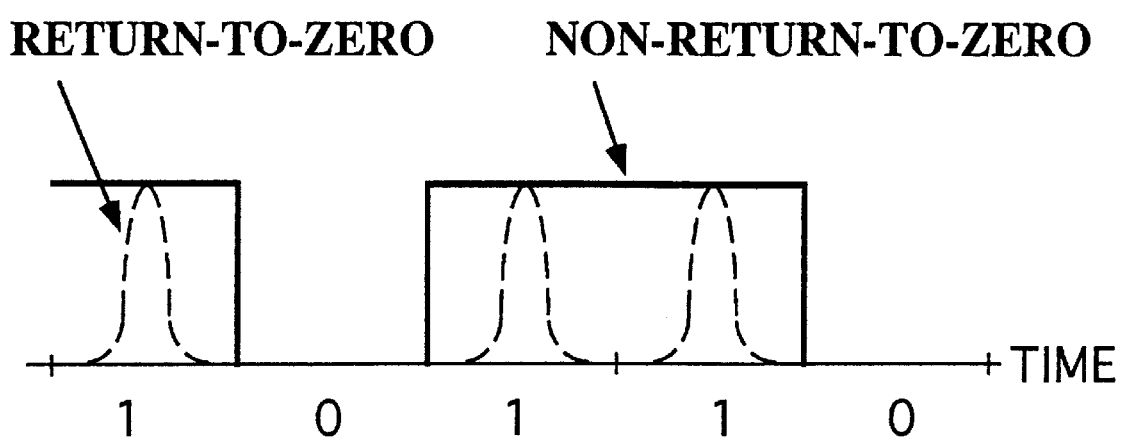
FIG. 1 depicts non-return-zero and return-to-zero data.
Figure 2:
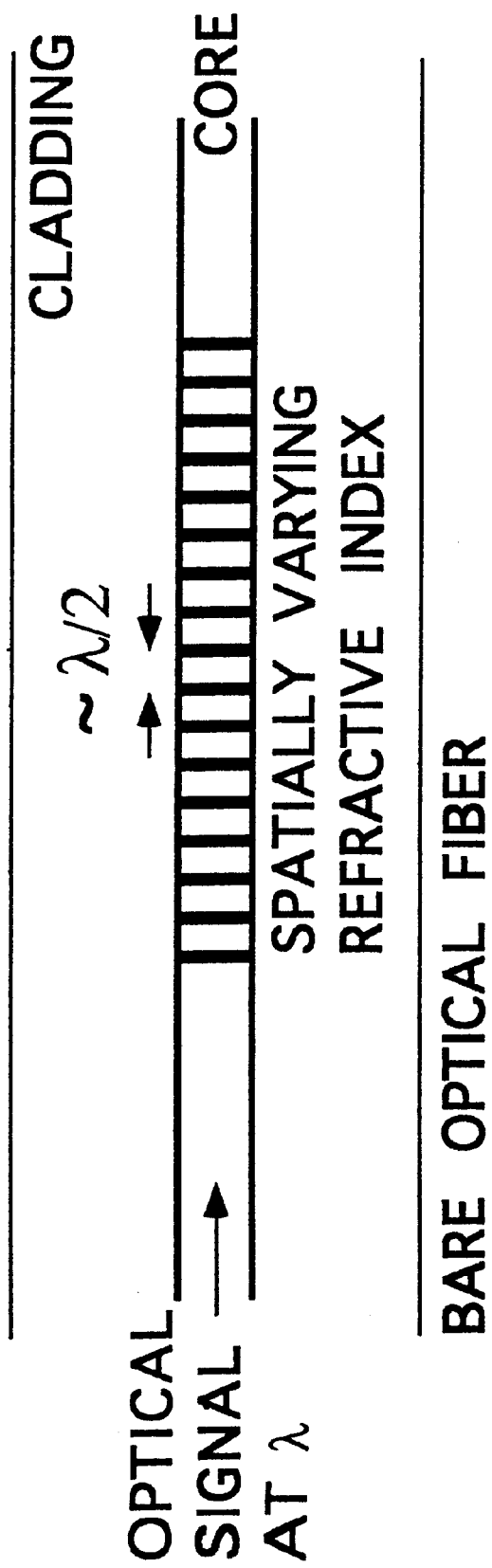
FIG. 2 shows a schematic diagram of a fiber Bragg grating.

According to our invention, the preferred embodiment of an optical discriminator is a fiber Bragg grating. A fiber Bragg grating consists of a segment of grating structure along the propagation direction in an optical fiber. The grating structure is a spatially modulated refractive index in the fiber core as shown in FIG. 2. The index variation is generated by exposing a bare optical fiber to spatially modulated intensity radiation in the ultraviolet wavelength range as described by Hill et al. in "Fiber Bragg grating technology fundamentals and overview," *J. Lightwave Technology*, vol. 15, p. 1263 (1997). The period of the index variation is on the order of $\lambda/2$ as shown in FIG. 2, where $\lambda$ is the wavelength of the optical signal that is being transmitted or reflected by the grating. Fiber grating spectra can be designed by tailoring the core refractive index profile as described by Erdogan in "Fiber grating spectra," *J. Lightwave Technology*, vol. 15, p. 1277 (1997). This enables fiber grating spectra with sharp transition from ~0 to ~100% transmission to be constructed. It is the edge of the transmission or reflection of the grating spectrum that forms the optical discriminator in the present invention.

It is well-known that spectra of fiber grating is susceptible to environmental perturbations such as applied mechanical stress and ambient temperature fluctuation. To maintain the integrity of the spectra the fiber grating can be temperature-stabilized by active temperature control or use of thermal-compensation packaging as described by Fleming et al. in "Article comprising a temperature compensated optical fiber refractive index grating," U.S. Pat. No. 5,694,503. The latter technique uses packaging material with opposite thermal expansion coefficient to that of silica fiber is preferred because it does not require any active electronic components and temperature sensors. Therefore, it is assumed in the present invention that fiber gratings are packaged in a manner that makes them immune to mechanical and thermal stresses.

It is understood that fiber grating can be constructed in a manner that the optical wave couples into the forward propagating cladding mode of the fiber and be absorbed by the fiber buffer material surrounding the cladding. The cladding of a fiber has a refractive index slightly lower than that of the core. In this case, the backward-propagating light is negligible. An example of such a fiber grating is a temperature insensitive long-period fiber grating as described in U.S. Pat. No. 5,703,978 issued to DiGiovanni et al. in which the reflected optical wave in the fiber core is converted into the forward travelling non-guided cladding mode.

Figure 3:
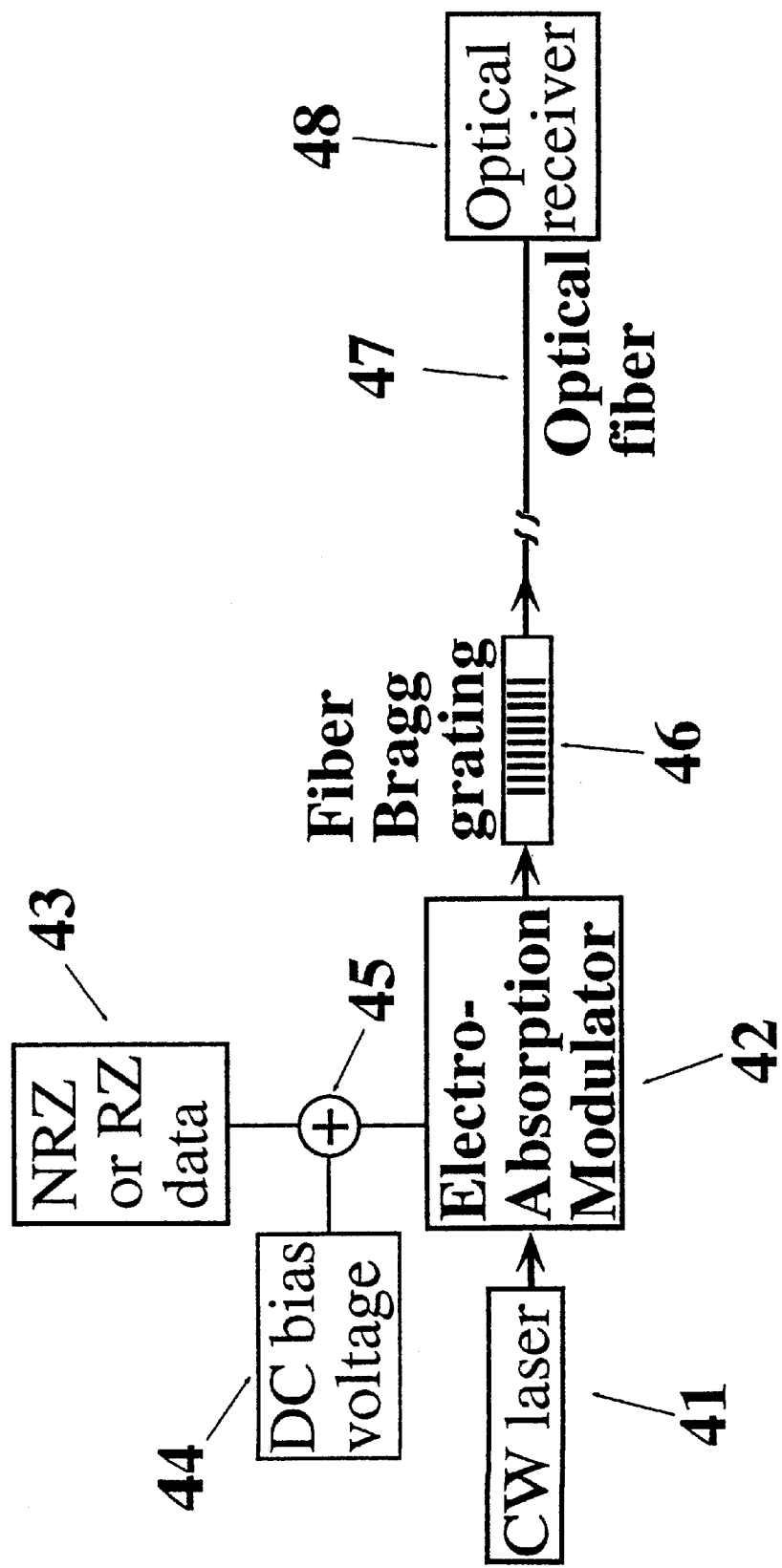
FIG. 3 depicts a schematic diagram of an optical transmitter according to a first embodiment of this invention.
Figure 4:
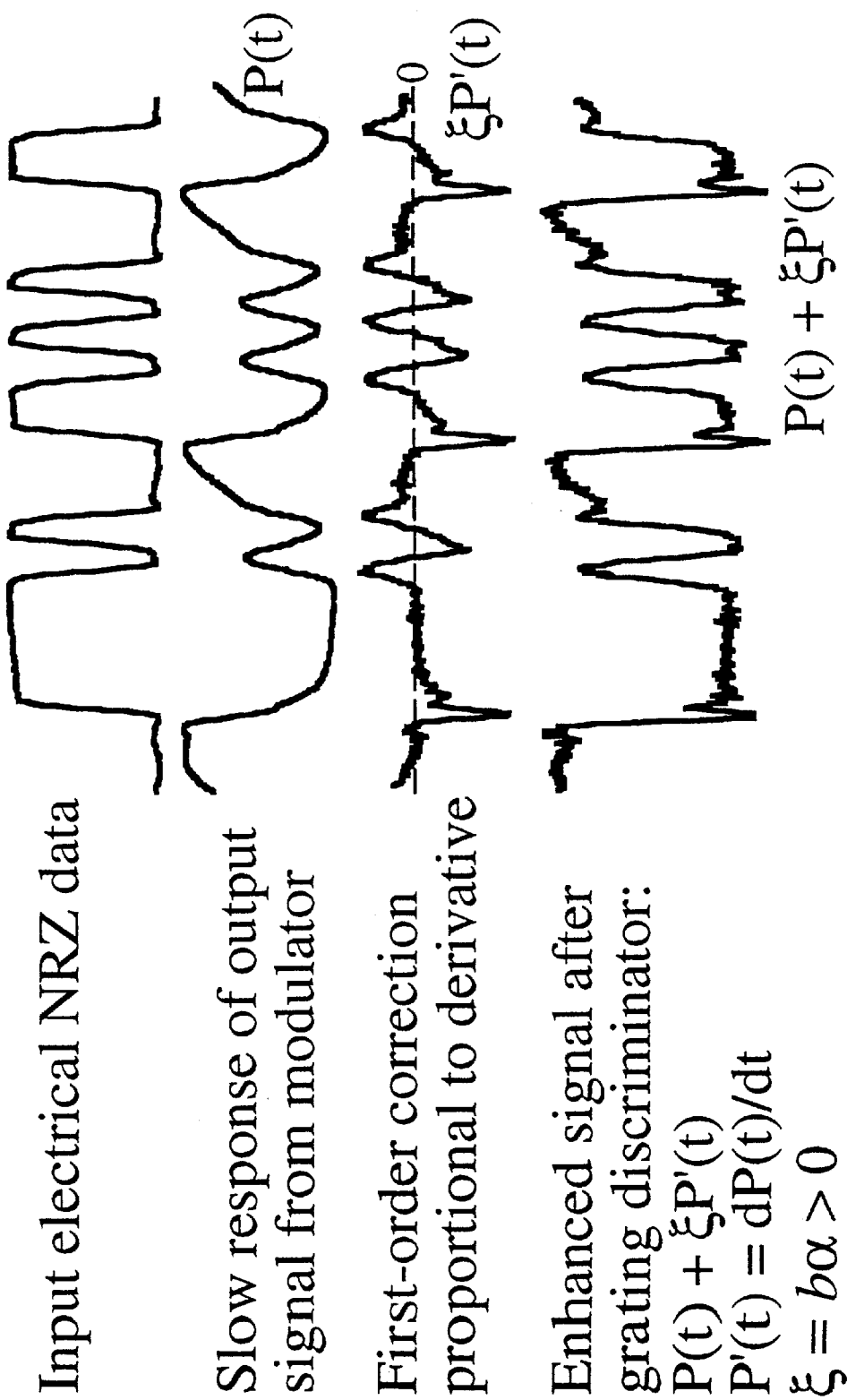
FIG. 4 shows an example of signal improvement using a fiber grating discriminator.
Figure 5:
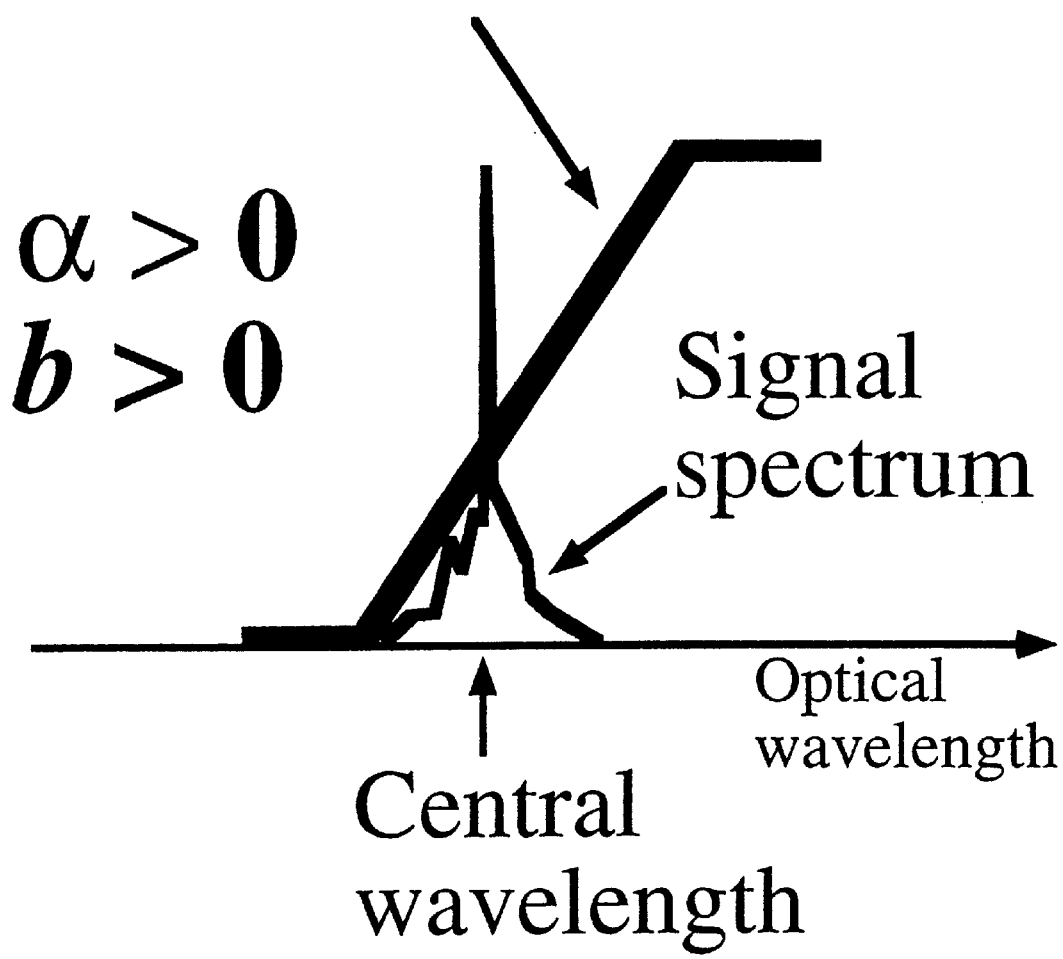
FIG. 5 shows the required grating slope for $\alpha > 0$.
Figure 6:
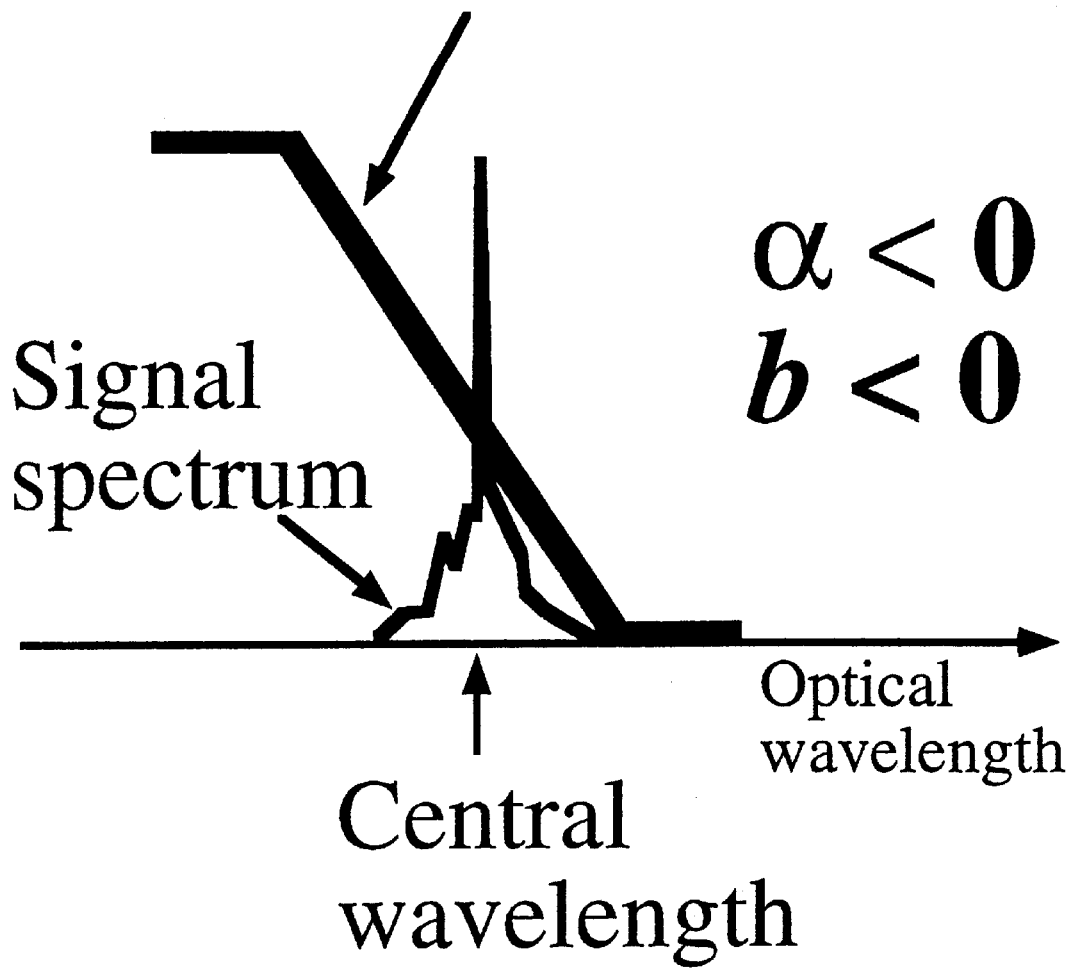
FIG. 6 shows the required grating slope for α<0.

The first embodiment of the present invention shown in FIG. 3 is an optical transmitter. A continuous-wave (CW) laser 41 and a voltage-driven electroabsorption modulator 42 produces modulated optical output. Electrical signal in the form of NRZ or RZ data format 43 are combined with a DC bias voltage 44 through an electronic adder 45, commonly referred to as bias-T, is applied to the electrical input of the electroabsorption modulator 42. The fiber grating discriminator 46 takes advantage of the phase modulation at the transitions by converting it to useful intensity modulation. In the time domain, the fiber grating 46 achieves this function by effectively taking the time derivative of the signal's electric field and adding it to itself with a phase shift of $\pi/2$ as described by Mahgerefteh et al. in *IEEE Photon. Techol. Lett.*, vol. 9, pp. 1583–1585, 1997. As a result, the sharpness of the transitions of the intensity of the signal is significantly enhanced. This process is illustrated in FIG. 4 using a NRZ data as an example where P(t) represents the intensity of the signal. The weight of time derivative that can be added to the signal is directly proportional to the product of the chirp parameter, $\alpha$, of the modulator and the slope of the grating, b, which is defined here as the rate of change of the electric field transmission relative to the optical wavelength. The chirp parameter, $\alpha$, is defined here as the negative of that as defined by Koyama et al. in "Frequency chriping in external modulators," *J. Lightwave Technology*, vol. 6, p. 87 (1998) such that a positive $\alpha$ implies higher optical wavelengths on the rising or leading edge and lower optical wavelengths on the falling or trailing edge of the pulse and vice versa for a negative $\alpha$. The slope should be chosen such that $b\alpha>0$ as shown in FIG. 5 and FIG. 6 to produce signal enhancement. The magnitude of b should be approximately chosen to be $|c/(\alpha f_{3-dB}\lambda^2)|$ where c and $\lambda$ are, respectively, the speed of light and the wavelength of the signal and $f_{3-dB}$ is the roll-off frequency of the electroabsorption modulator.

In addition to conversion of phase to intensity modulation of the signal by the slope of the grating, the phase of the grating discriminator also plays an important role in shaping the temporal and spectral properties of the signal by providing the appropriate amount of dispersion compensation to the signal as described by Litchinitser et al. in *J. Lightwave Technology*, vol. 15, p. 1303 (1997). As a result, transmission characteristics of the output signal is significantly enhanced. This enables the signal to propagate longer distances in dispersive optical fiber 47 while maintaining low bit-error-rate at the optical receiver 48 as shown in FIG. 3. It is understood that the fiber grating can also be placed before the optical receiver 48 to achieve similar functions as an optical discriminator.

Figure 7:
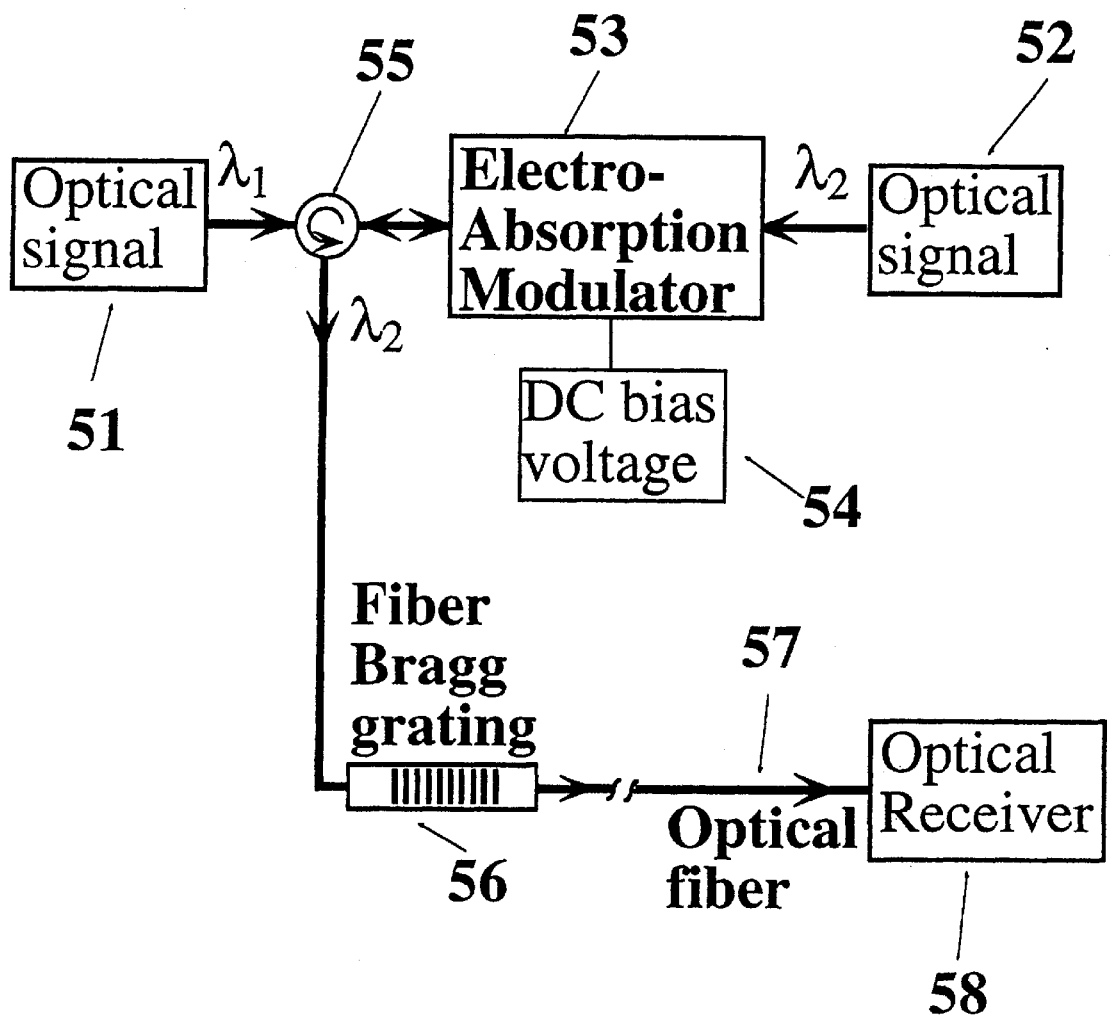
FIG. 7 shows a schematic diagram of an all-optical modulator according to a second embodiment of this invention.

An object of the second embodiment of the present invention is to increase the modulation response of an electroabsorption modulator used as an all-optical modulator. As shown in FIG. 7, an optical signal 51 at $\lambda_1$ and another optical signal 52 at $\lambda_2$ is launched simultaneously into an electroabsorption modulator 53 in a counter-propagating configuration. The optical signal 51 at $\lambda_1$ reduces the applied electric field and thus decreases the absorption of the electroabsorption modulator 53 operating at a DC bias voltage 54. The collapse of the applied electric field is initiated by an opposing carrier-induced internal electric field as described by Edagawa et al. in OFC '97 *Technical Digest*, p. 77, 1997. Information is therefore transcribed from an optical signal at $\lambda_1$ to another optical signal at $\lambda_2$. The output signal at $\lambda_2$ is extracted through the reflection port of a circulator 55.

According to our invention, a fiber grating discriminator 56 is inserted after the reflection port of the circulator 55 as shown in FIG. 7 to increase the modulation response. The fiber grating converts the phase modulation of the output signal at $\lambda_2$ to useful intensity modulation as described in the first embodiment of this invention. The sign of b is to be chosen according to the sign of $\alpha$ such that $b\alpha$ is positive. The optical signal at $\lambda_2$ after the discriminator has reduced chirp because of the efficient conversion of phase to intensity modulation. This enables the signal to propagate distortionless in dispersive optical fiber 57 before detected at the optical receiver 58 as shown in FIG. 7.

Figure 8:
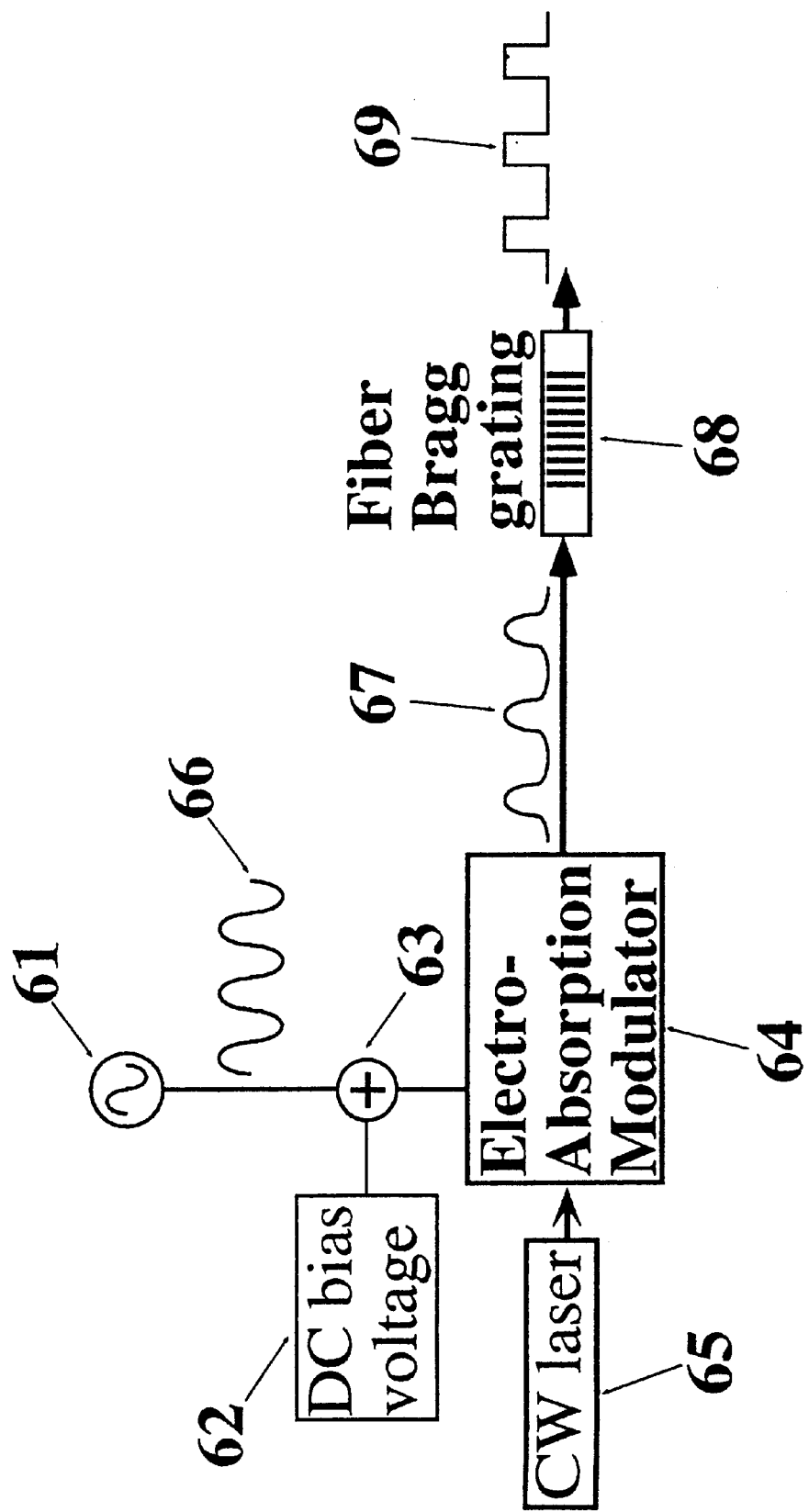
FIG. 8 shows a schematic diagram of a pulse generator according to a third embodiment of this invention.

An objective of the third embodiment of the present invention is to increase the modulation response of an electroabsorption modulator for generation of optical pulses as shown in FIG. 8. Sinusoidal electrical signal 61 with frequency f combined with a DC bias voltage 62 through an electronic adder 63 is launched into an electroabsorption modulator 64. A CW laser 65 is coupled to the electroabsorption modulator 64. The sinusoidal signal 66 causes temporal variation of the absorption coefficient of the electroabsorption modulator 64. Transmission of the CW laser 65 through the electroabsorption modulator 64 is highly nonlinear because of its exponential dependence of the absorption coefficient. This results in the generation of an optical pulse train 67 with repetition rate f from the electroabsorption modulator 64 as described by Devaux in U.S. Pat. No. 5,559,628. As the frequency f approaches the modulation bandwidth of the electroabsorption modulator, the pulses 67 are significantly broadened with long rise and fall times. According to our invention, a fiber grating discriminator 68 is placed after the electroabsorption modulator 64 as shown in FIG. 8. The sign of $\alpha$ determines the sign of the discriminator slope b such that $b\alpha>0$. Phase modulations at the pulse edges are converted to intensity modulation using the slope of the grating discriminator 68 to add weighted derivative to itself. This sharpens the transitions of the output pulses 69 effectively increasing the modulation response of the pulse generator.

Other embodiment of an optical discriminator for the purposes of this invention is a Fabry-Perot filter. Fabry-Perot are transmission filters with spectra that have transition regions with a slope. These filters can be used to perform conversion of phase to intensity modulation as described in the embodiments of the present invention. The filter is tuned such that the signal spectrum lies on the slope of the said filter similar to FIG. 5 and FIG. 6. The sign and magnitude of the slope has to be chosen as described above.

What is claimed is:

1. Electro-optical transmission system comprising:
   an optical signal of a first wavelength,
   an electroabsorption modulator to intensity and phase modulate the optical output of said first wavelength of said optical signal, and
   an optical discriminator to convert said intensity- and phase-modulated signal to an enhanced intensity-modulated optical signal in such a way as to decrease the apparent response time and the chirp of the electroabsorption modulator.

2. An electro-optical transmission system as described in claim 1, wherein said discriminator is a fiber grating optical filter.

3. An electro-optical transmission system as described in claim 2, wherein said signal modulating said modulator is a sinusoidal electrical signal.

4. An electro-optical transmission system as described in claim 2, wherein operation of said fiber optical filter can be selected between transmission and reflection.

5. An electro-optical transmission system as described in claim 2, wherein said intensity- and phase-modulated signal lies in a transition region of the transmission spectrum of said discriminator.

6. An electro-optical transmission system as described in claim 2, wherein the center frequency of said modulated output lies in the transition region of the spectrum of the filter having a slope so as to sharpen the transitions between the intensity profile of said optical signal of said first wavelength.

7. An electro-optical transmission system as described in claim 2, wherein said fiber grating has a long period relative to said first wavelength and couples light from core mode to cladding modes.

8. An electro-optical transmission system as described in claim 2, wherein said signal modulating said modulator is a digital electrical signal.

9. An electro-optical transmission system as described in claim 2, wherein said signal modulating said modulator is an optical signal of a second wavelength.

10. An electro-optical transmission system as described in claim 1, wherein said discriminator is a Fabry-Perot optical filter.

11. A method of transmitting an optical signal, comprising the steps of:
    inputting an optical signal of a first wavelength,
    modulating an electroabsorption modulator with an input signal to produce an intensity- and phase-modulated signal of said first wavelength,
    passing said intensity- and phase-modulated signal through an optical discriminator to convert said phase-modulated signal into an enhanced intensity-modulated signal.

12. A method as described in claim 11, wherein the center frequency of said phase-modulated signal lies in the transition region of the frequency spectrum of the discriminator.

13. A method as described in claim 12, wherein said transition region has a positive slope.

14. A method as described in claim 12, wherein said transition region has a negative slope.

15. A method as described in claim 11, wherein said discriminator is a fiber grating filter operating in forward-going core mode.

16. A method as described in claim 15, wherein said fiber grating filter has a long period relative to said first wavelength to couple a forward-going core mode to cladding modes.

17. A method as described in claim 11, wherein said input signal is a digital electrical signal.

18. A method as described in claim 11, wherein said input signal is an optical signal of second wavelength different from said first wavelength.

19. A method as described in claim 11, wherein said discriminator is a fiber grating filter operating in backward-going core mode.

20. A method as described in claim 11, wherein said input signal is a sinusoidal electrical signal.

* * * * *